(12) United States Patent
Rezvani et al.

(10) Patent No.: US 6,985,521 B1
(45) Date of Patent: Jan. 10, 2006

(54) METHOD AND APPARATUS FOR CHANNEL ESTIMATION FOR X-DSL COMMUNICATIONS

(75) Inventors: Behrooz Rezvani, Pleasanton, CA (US); Sam Heidari, Fremont, CA (US); Dale Smith, Fremont, CA (US)

(73) Assignee: Ikanos Communication, INC, Fremont, CA (US)

( * ) Notice: Subject to any disclaimer, the term of this patent is extended or adjusted under 35 U.S.C. 154(b) by 769 days.

(21) Appl. No.: 09/779,789

(22) Filed: Feb. 7, 2001

Related U.S. Application Data

(63) Continuation of application No. 09/757,036, filed on Jan. 8, 2001.

(60) Provisional application No. 60/175,012, filed on Jan. 7, 2000.

(51) Int. Cl.
*H04B 1/38* (2006.01)
*H03D 1/00* (2006.01)

(52) U.S. Cl. ...................................... 375/222; 375/343

(58) Field of Classification Search ................ 375/219, 375/222, 224–228, 258, 377, 343
See application file for complete search history.

(56) References Cited

U.S. PATENT DOCUMENTS

| | | | |
|---|---|---|---|
| 4,911,515 A | 3/1990 | So et al. | 350/96.16 |
| 4,968,880 A | 11/1990 | Beller | 250/227.21 |
| 5,179,420 A | 1/1993 | So et al. | 356/73.1 |
| 5,410,264 A * | 4/1995 | Lechleider | 327/311 |
| 5,699,402 A | 12/1997 | Bauer et al. | 379/26 |
| 5,809,019 A * | 9/1998 | Ichihara et al. | 370/334 |
| 6,167,034 A * | 12/2000 | Langberg et al. | 370/281 |
| 6,438,183 B1 * | 8/2002 | Taura et al. | 375/343 |
| 6,480,532 B1 * | 11/2002 | Vareljian | 375/222 |
| 6,483,867 B1 * | 11/2002 | Mannermaa | 375/149 |

* cited by examiner

*Primary Examiner*—Temesghen Ghebretinsae
*Assistant Examiner*—Sam K. Ahn
(74) *Attorney, Agent, or Firm*—IP Creators; Charles C Cary

(57) ABSTRACT

An apparatus and method is disclosed for channel estimation in an X-DSL communication device. The communication device may include physical or logical modems. The modems may implement one or more of a group of X-DSL protocols including: G.Lite, ADSL, VDSL, and HDSL. The apparatus may be used for determining the location and magnitude of discontinuities or faults within the communication medium to which the X-DSL communication device is coupled. The information provided by the device may be used for line qualification or repair. No additional equipment is required for channel estimation. Instead the apparatus may be located within a single modem or shared between a group of modems. An N bit pseudo random codeword injected into the transmit path is used to generate both a leakage signal and a plurality of reflected signals on the receive path. No timing information is needed from the transmit path. Instead a unique correlator is utilized on the receive path to extract timing information for the reflected signals relative to the leakage signal. The broad bandwidth of the codeword and its relatively long duration allow channel estimation at significantly higher signal-to-noise ratios and with greater degrees of accuracy than heretofore possible.

3 Claims, 6 Drawing Sheets

Correlation

METHOD AND APPARATUS FOR CHANNEL ESTIMATION FOR X-DSL COMMUNICATIONS

CROSS REFERENCE TO RELATED APPLICATION

This application is a continuation of copending U.S. application Ser. No. 09/757,036 filed Jan. 8, 2001 entitled "Method and Apparatus for Channel Estimation for X-DSL Communications" which claims the benefit of prior filed Provisional Applications No. 60/175,012 filed on Jan. 7, 2000 entitled "Ranging Algorithm for Channel Estimation for X-DSL Application". Each of the above-cited applications is incorporated herein by reference in its entirety.

BACKGROUND OF THE INVENTION

1. Field of Invention

The field of the present invention relates in general to X-DSL communication devices and more particularly to a method and apparatus for channel estimation and fault detection in X-DSL communication systems.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including, G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, SDSL, MDSL, RADSL, HDSL, etc.

One of the factors limiting the setup and operation of X-DSL communication systems is channel quality. Not all communications mediums, e.g. subscriber lines are capable of supporting various of the X-DSL protocols. On a subscriber line the presence of bridges, taps, isolators, filters etc. may effect channel quality to the point where a given protocol may not be supported. Alternately, in operation channel quality may degrade due to improper repair or maintenance of the subscriber line. In each instance the typical solution is to decouple the subscriber line in the frame room of the PSTN central office and to couple it to test equipment. The test equipment typically injects an impulse into the line and measures the amplitude and delay of each of the resultant echoes or reflections generated by the line. The pulse typically has a duration shorter than the delay interval between any of the reflections in order to distinguish one reflection from the other. The energy injected into the line by the pulse determines the accuracy and completeness of the channel estimation produced thereby. A number of factors, however limit the energy of the pulse; i.e. its duration, subscriber line voltage/current limits, and the need to minimize interference with adjacent subscriber lines to which service is being provided.

What is needed are approaches to line estimation, qualification and fault detection that are lower in cost and which permit automation.

SUMMARY OF THE INVENTION

An apparatus and method is disclosed for channel estimation in an X-DSL communication device. The communication device may include physical or logical modems. The modems may implement one or more of a group of X-DSL protocols including: G.Lite, ADSL, VDSL, and HDSL. The apparatus may be used for determining the location and magnitude of discontinuities or faults within the communication medium to which the X-DSL communication device is coupled. The information provided by the device may be used for line qualification or repair. No additional equipment is required for channel estimation. Instead the apparatus may be located within a single modem or shared between a group of modems. An N bit pseudo random codeword injected into the transmit path is used to generate both a leakage signal and a plurality of reflected signals on the receive path. No timing information is needed from the transmit path. Instead a unique correlator is utilized on the receive path to extract timing information for the reflected signals relative to the leakage signal. The broad bandwidth of the codeword and its relatively long duration allow channel estimation at significantly higher signal-to-noise ratios and with greater degrees of accuracy than heretofore possible.

In an embodiment of the invention an apparatus for channel estimation of a communication device with a transmit path and a receive path both coupled to a communication medium is disclosed. The apparatus includes a generator, an analog-to-digital converter ("ADC"), and a correlator. The generator couples to the transmit path for periodically injecting a codeword signal into the transmit path which effects both a leakage signal on the receive path as well as reflected signals from various portions of the communication medium. The ADC couples to the receive path to digitize a composite received signal including both the leakage signal and the reflected signals. The correlator correlates delays between the leakage signal and each of the reflected signals to estimate channel characteristics for the communication medium.

In an embodiment of the invention a method for channel estimation in a communication device with a transmit path and a receive path both coupled to a communication medium is disclosed. The method comprising the acts of:

periodically injecting a codeword signal into the transmit path which effects both a leakage signal on the receive path as well as reflected signals from various portions of the communication medium, digitizing a composite received signal including both the leakage signal and the reflected signals, and correlating delays between the leakage signal and each of the reflected signals to estimate channel characteristics for the communication medium.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

An apparatus and method is provided for minimizing in channel distortion in an X-DSL communication device is disclosed. The communication device may include physical or logical modems. The apparatus may be incorporated in an existing X-DSL architecture without additional circuitry. The apparatus may be used for determining the location and magnitude of discontinuities or faults within the communication medium to which the X-DSL communication device is coupled. The information provided by the device may be used for line qualification or repair. No additional equipment is required for channel estimation. Instead the apparatus may be located within a single modem or shared between a group of modems. An N bit pseudo random codeword injected into the transmit path is used to generate both a leakage signal and a plurality of reflected signals on the receive path. The broad bandwidth of the codeword and its relatively long duration allow channel estimation at significantly higher signal-to-noise ratios and with greater degrees of accuracy than heretofore possible. No timing information is needed from the transmit path. Instead a unique correlator is utilized on the receive path to extract timing information for the reflected signals relative to the leakage signal. The apparatus may be applied with equal advantage to communication protocols other than X-DSL. The apparatus may be applied with equal advantage in wired and optical media.

Figure 1:
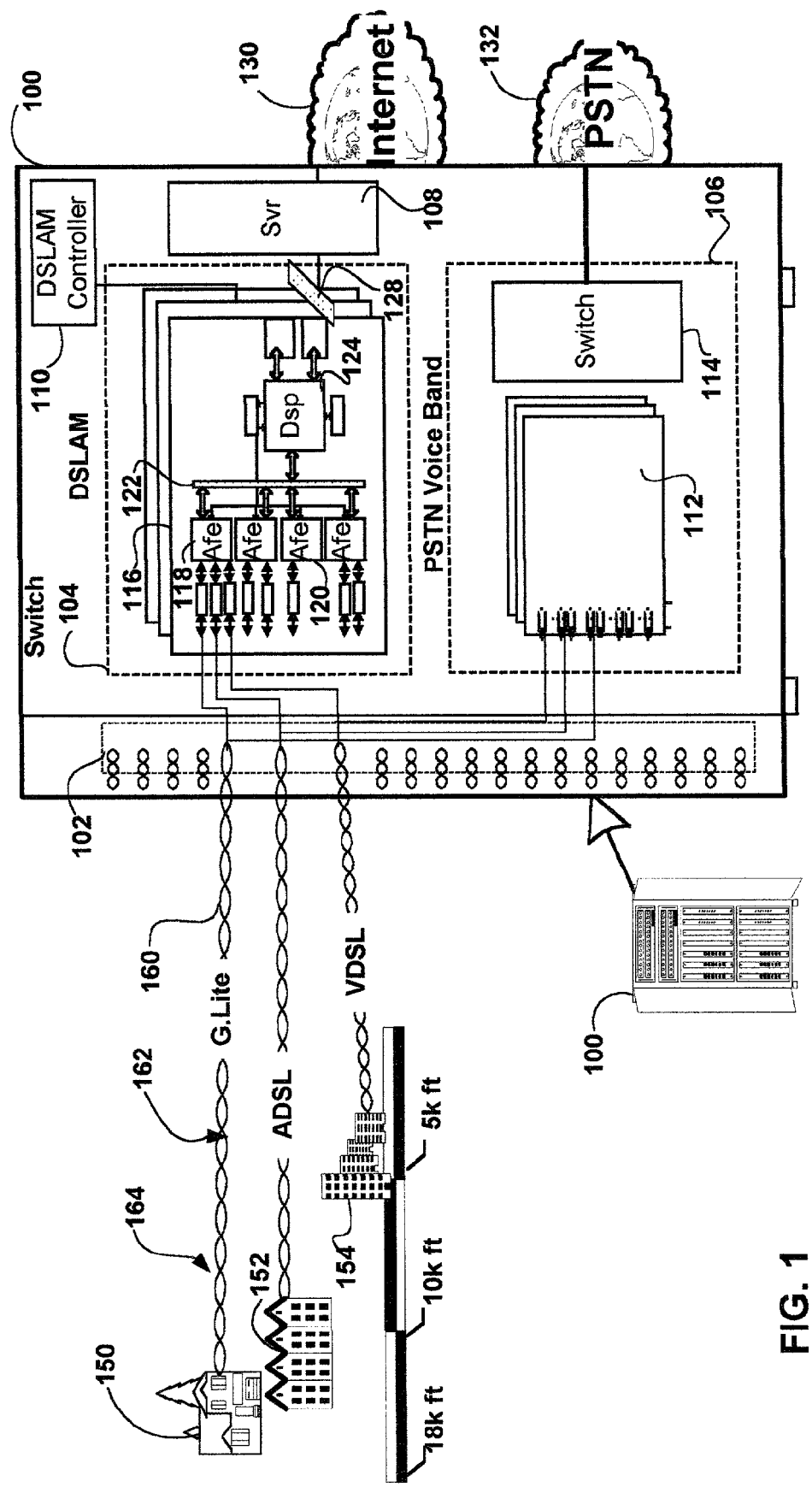
FIG. 1 shows an X-DSL communication system with a set of multi-mode multi-channel logical modems at a public switched telephone network (PSTN) central office (CO) coupled across a plurality of subscriber lines to a plurality of remote subscriber sites.

FIG. 1 shows an X-DSL communication system with a set of multi-mode multi-channel logical modems at a public switched telephone network (PSTN) central office (CO) coupled across a plurality of subscriber lines to a plurality of remote subscriber sites. The system includes a CO 100 coupled via corresponding subscriber lines to remote sites 150–154.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFE's 118–120 each capable of supporting a plurality of subscriber lines. The AFEs are coupled via a packet based bus 122 to the DSP 124. For downstream communications the transmit path from the CO to the remote site includes the DSP which modulates the data for each communication channel and the AFE which transforms the digital symbol packets assembled by the DSP and converts them to an analog signal which is output on the subscriber line associated with the respective channel. For upstream communications the receive paths for each channel from the remote sites to the CO include conversion of each received channel within the corresponding AFE to a digitized data sample which is sent to the DSP for demodulation. The DSP is capable of multi-protocol support for all subscriber lines to which the AFE's are coupled.

Communications between AFE's and DSP(s) may be packet based, in which embodiment of the invention a distributed architecture such as will be set forth in the following FIG. 2 may be implemented. The line card 116 is coupled to a back-plane bus 128 which may be capable of offloading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. In an alternate embodiment of the invention discrete modems would each couple to an associated one of the subscriber lines rather than the logical modem shown. When an X-DSL communication is established on a subscriber line, a specific channel identifier is allocated to that communication. That identifier is used in the above mentioned packet based embodiment to track each packet as it moves in an upstream or downstream direction between the AFE and DSP. These modules, AFE and DSP, may be found on a single universal line card, such as line card 116 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

A number of discontinuities 162–164 in the subscriber line 160 are shown for example. These correspond with reflective elements of the line such as repeaters, taps, isolators or breaks. Unique logic implemented in hardware or software on either or both the AFE or DSP is set forth in the following FIGS. 2–6 for accurate channel estimation to locate and characterize each subscriber line including the discontinuities therein.

Figure 2:
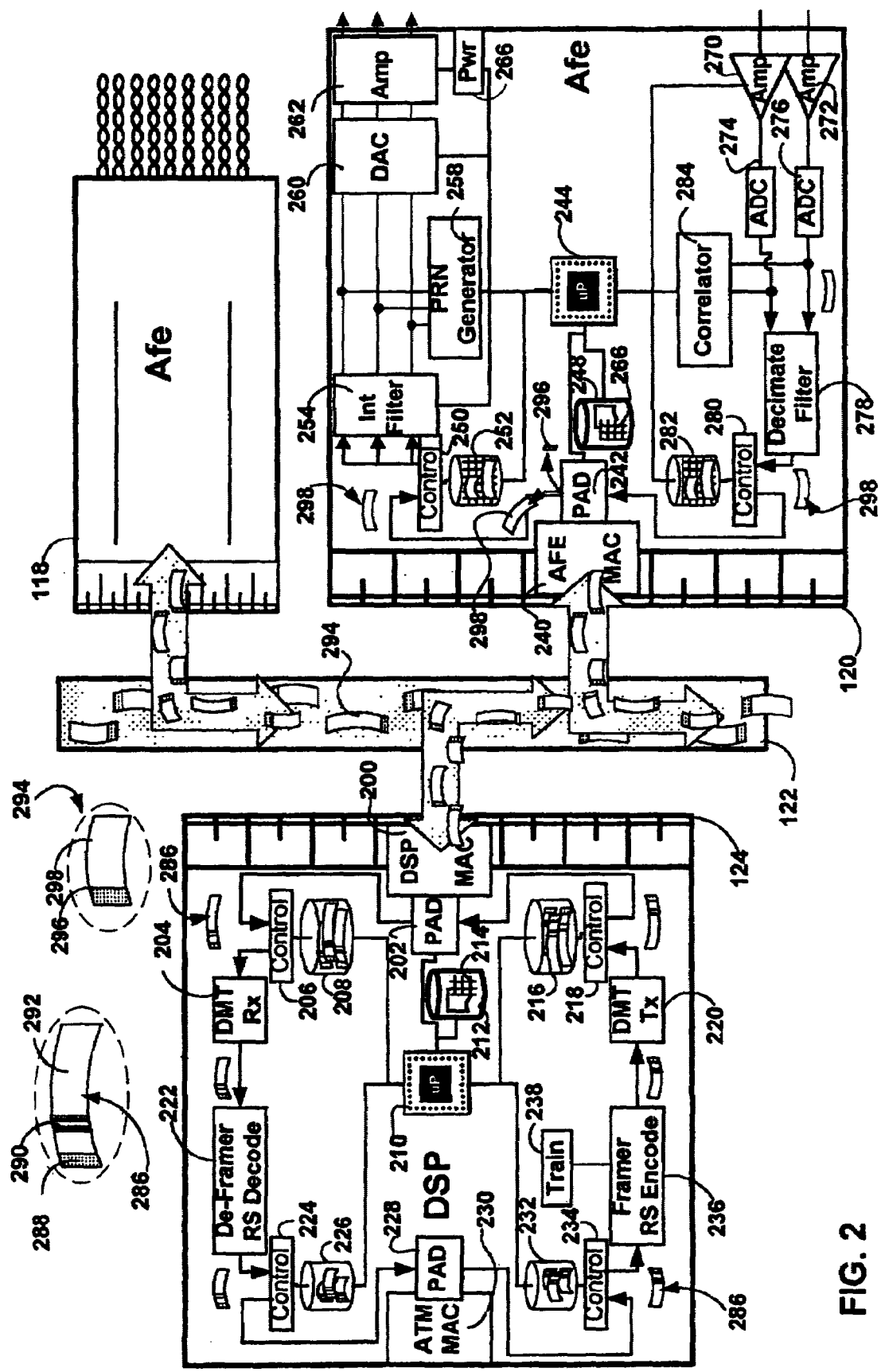
FIG. 2 is a detailed hardware block diagram of one of the modem line cards shown in FIG. 1.

FIG. 2 is a detailed hardware block diagram of one of the modem line cards shown in FIG. 1. FIG. 2 shows a packet based multi-channel transmission architecture within which the current invention may be implemented. In this architecture a DSP 124 handles processing for a number of channels of upstream and downstream subscriber line communications via a number of AFE's. Each AFE in turn accepts packets associated with a plurality of subscriber lines to which each AFE is coupled. FIG. 2 shows a packet based raw data processing both between a DSP and AFE as well as within each DSP and AFE. Packet processing between DSP and AFE modules involves transfer of bus packets 294 each with a header portion 296 and data portion 298. The header contains information correlating the data with a specific channel and direction, e.g. upstream or downstream of communication. The data portion contains for upstream traffic digitized samples of the received data for each channel and for downstream packets digitized symbols for the data to be transmitted on each channel. Packet processing within a DSP may involve device packets 286. The device packets may include a header 288, a control portion 290 and a data portion 292. The header serves to identify the specific channel and direction. The header may contain control information for the channel to be processed. The control portion 290 may also contain control portions for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line.

These modules, AFE and DSP, may be found on a single universal line card, such as line card 116 in FIG. 1. They may alternately be displaced from one another on separate line cards linked by a DSP bus. In still another embodiment they may be found displaced across an ATM network.

DSP line card 116 includes one or more DSP's. In an embodiment of the invention each may include structures set forth in the figure for handling of multiple line codes and multiple channels. The line card includes, a DSP medium access control (MAC) 200 which handles packet transfers to and from the DSP bus 122. The MAC couples with a packet assembler/disassembler (PAD) 202. For received DSP bus packets, the PAD handles removal of the DSP bus packet header 296 and insertion of the device header 288 and control header 290 which is part of the device packet 286. The content of these headers is generated by the core processor 212 using statistics gathered by the de-framer 222. These statistics may include gain tables, or embedded operations channel communications from the subscriber side. The PAD embeds the required commands generated by the core processor in the header or control portions of the device packet header. Upstream device packets (Receive packets) pass into a first-in-first-out FIFO buffer 208 which is controlled by FIFO controller 206. These packets correspond with multiple protocols and multiple channels. Each is labeled accordingly. The receive processing engine 204 in this case a DMT engine fetches packets and processes the data in them in a manner appropriate for the protocol, channel and command instructions, if any, indicated by the header. The processed data is then passed to the De-Frame and Reed Solomon Decoder 222. This module reads the next device packet and processes the data in it in accordance with the instructions or parameters in its header. The processed de-framed data is passed to the final FIFO buffer 226 which is controlled by controller 224. That data is then passed to the ATM pad 228 for wrapping with an ATM header and removal of the device header. The ATM MAC 230 then places the data with an ATM packet on the ATM network 130 (see FIG. 1).

Control of the receive modules, e.g. DMT engine 204 and de-framer decoder 222 as well as sub modules thereof is implemented as follows. The core processor 210 has DMA access to the FIFO buffer 226 from which it gathers statistical information on each channel including gain tables, or gain table change requests from the subscriber as well as instructions in the embedded operations portion of the channel. Those tables 214 are stored by the core processor in memory 212. When a change in gain table for a particular channel is called for, the core processor sends instructions regarding the change in the header of the device packet for that channel via PAD 202 and writes the new gain table to a memory which can be accessed by the appropriate module, i.e. DMT module 204, or the appropriate sub module thereof, as a packet corresponding to that channel is received by the module. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different X-DSL protocols, e.g. a packet with ADSL sample data followed by a packet with VDSL sampled data. Within the DMT Rx engine 204 for example, there may be sub modules with independent processing capability such as: a time domain equalizer, a cyclic prefix remover, a DFT, a gain scalar, a trellis decoder and a tone recorder, as well as filters, a windowers . . . etc. Each of these sub modules has its counterpart on the DMT Tx engine 220 in the transmit path. Each of these may independently respond to successive device headers to change parameters between successive packets. For example as successive packets from channels implementing G.Lite, ADSL and VDSL pass through the DMT Tx engine the number of tones will vary from 128 for G.lite, to 256 for ADSL, to 2048 for VDSL. The framer and de-framer will use protocol specific information associated with each of these channels to look for different frame and super frame boundaries. The DMT receive engine 204 implements processes for monitoring a monitor tone on the upstream channel during the setup and configuration phases of the method for adaptively minimizing out of band interference and in band distortion. The measured level of each tone is maintained by processor 210 in memory 212. This same memory may be utilized for calculating the inverse channel model for each of the channels to determine the amount of pre-distortion to be applied to downstream data on each of the channels.

On the downstream side, i.e. Transmit, the same architecture applies. ATM data which is unwrapped by PAD 228 is re-wrapped with a device header the contents of which are again dictated by the core processor 210. That processor embeds control information related to each channel in the packets corresponding to that channel. The device packets are then passed to the FIFO buffer 232 which is controlled by controller 234. The Framer and RS encoder 236 and or sub modules thereof then processes these packets according to the information contained in their header or control portions of each device packet. The Framer then updates the device packet header and writes the resultant device packet to the DMT transmit module 220. This module accepts the data and processes it for transmission. Transmission processing may include: tone ordering, trellis encoding, gain scaling, an IDFT, and cyclic prefix modules each with independent ability to read and respond to device headers. From the DMT Tx engine 220 each updated device packet with a digitized symbol(s) for a corresponding channel is placed in the FIFO buffer 216 under the control of controller 218. From this buffer the device packet is sent to PAD 202 where the device header is removed. The DSP PAD places the DSP packet 294 with an appropriate header onto the DSP bus 122 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet 294 on the bus 122 directed to AFE 120 is detected by AFE MAC 240 on the basis of information contained in the packet header. The packet is passed to PAD 242 which removes the header 296 and sends it to the core processor 244. The packet's header information including channel ID is stored in the core processor's memory 248. The information is contained in a table 266. The raw data 298 is passed to a FIFO buffer 252 under the control of controller 250. Each channel has a memory mapped location in that buffer.

On the transmit path, the interpolator 254 reads a fixed amount of data from each channel location in the FIFO buffer. The amount of data read varies for each channel depending on the bandwidth of the channel. The amount of data read during each bus interval is governed by entries in the control table for each channel which is established during channel setup and is stored in memory 248. The interpolator up samples the data and low pass filters it to reduce the noise introduced by the DSP. Implementing interpolation in the AFE as opposed to the DSP has the advantage of lowering the bandwidth requirements of the DSP bus 122. From the interpolator data is passed to the digital-to-analog converter (DAC) 260. The DAC converts the digitized symbol for each of the input signals on each of the input signal lines/channels to corresponding analog signals. These analog signals are introduced to the amplification stage 262, from which they are coupled to corresponding subscriber lines. The amplification stage is coupled to a power supply 266. The parameters for each of the modules 254, 260, 262, i.e. filter coefficients, amplifier gain etc. are controlled by the core processor using control parameters stored during session set up. For example, where successive packets carry packets with G.Lite, ADSL, and VDSL protocols the sample rate of the filter parameters for filter 254 and the gain of the analog amplifiers within stage 262 will vary for each packet. This "on the fly" configurability allows a single transmit or receive pipeline to be used for multiple concurrent protocols.

During line estimation or qualification the PRN generator 258 injects a pseudo-random-noise into the transmit path of one or more of the subscriber channels on the transmit path for transmission on the corresponding subscriber channel. The injection of this codeword results in a composite signal on the receive path for the corresponding channel which includes a leakage signal resulting from the leakage between the transmit and receive paths, i.e. self-NEXT, a.k.a. "Next End Cross-Talk", as well as echoes resulting from the reflection of the transmitted codeword of various discontinuities e.g. discontinuities 162–164 within the corresponding subscriber line (see FIG. 1). Where the transmit path includes filters (not shown) downstream of the location at which the codeword is injected, these filters may be switchably decoupled from the transmit path during the transmission of the codeword. The codeword may be injected periodically until the channel is characterized. In an embodiment of the invention the codeword has a length of pseudo randomness greater than the maximum delay time associated with the echo or reflections which result from the discontinuities on the line. This code length maximizes the energy associated with channel estimation by extending the injection interval beyond that associated with a single pulse.

Figure 3:
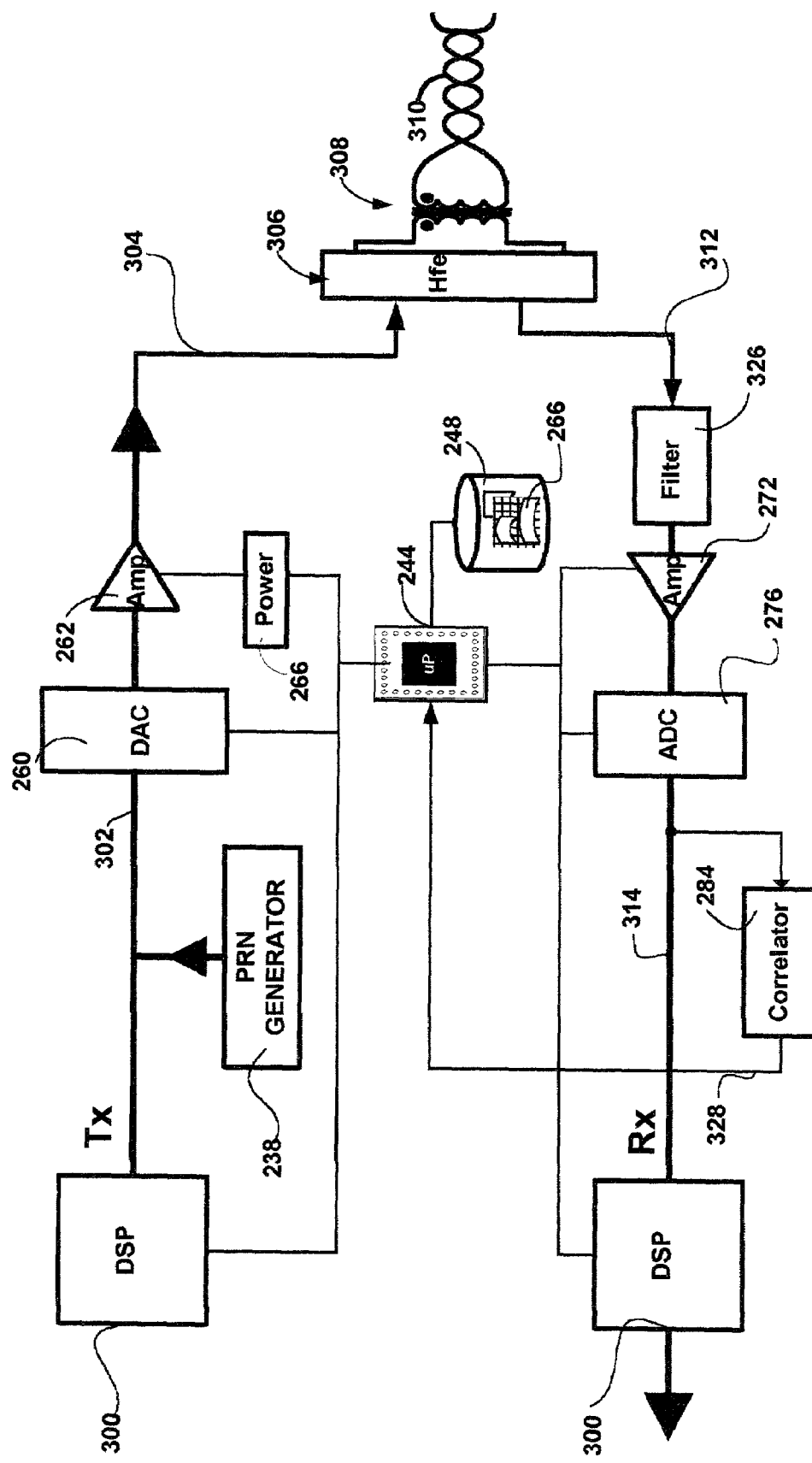
FIG. 3 is a detailed logical block diagram showing basic logic blocks associated with the apparatus for channel estimation of the current invention.

On the upstream path, the receive path, individual subscriber lines couple to individual line amplifiers, e.g. 270–272, through splitter and hybrids (See FIG. 3.). Each channel is passed to dedicated ADC modules 274–276. Next each channel may be subject to further filtering and decimation 278. As discussed above in connection with the transmit path, each of these components is configured on the fly for each new packet depending on the protocol associated with it. Each channel of data is then placed in a memory mapped location of FIFO memory 282 under the control of controller 280. Scheduled amounts of this data are moved to PAD 242 during each bus interval. The PAD wraps the raw data in a DSP header with channel ID and other information which allows the receiving DSP to properly process it. In an alternate embodiment of the invention the same packet based control principal may be used in both the transmit and receive path to implement not only multiple protocols concurrently but alternate lines codes, e.g. CAP/QAM.

A correlator 284 is shown coupled to the receive path. The correlator embodiments of which are set forth in the following FIGS. 4AB, operates during the generation of the codeword for channel estimation. The correlator may be implemented as a discrete module, or as processes performed on the processor, e.g. processor 244. The correlator operates to receive from the corresponding ADC the digitized bits of the composite received signal which includes both the leakage signal and one or more reflected signals from various discontinuities within the corresponding subscriber line. The correlator generates an ordered set of correlation coefficients corresponding with various phasings of the codeword with the composite signal. These coefficients may be stored in memory in the correlator or in memory 248. The correlator detects peaks within these ordered coefficients, identifies which of the peaks corresponds with the leakage signal, and from that information determines the time delay, or offset, of each of the subsequent reflected signals along with their relative magnitudes. This information is then used to characterize the associated subscriber line discontinuities by location and by type using methods well known to those skilled in the art. Channel estimation does not require the PRN generator 258 to couple with the codeword generator. Since communications are packet based the actual time of transmission of the codeword may be difficult to determine. Instead a timing reference is generated by the detection of the leakage peak within the received composite signal. Additionally, the channel estimator may be implemented on a single line card and may be switched between various channels thereon. Finally, the length of the codeword results in a significant increase in the amount of energy applied to the subscriber line during channel estimation which greatly improves the quality of the line characterization as opposed to prior art designs.

FIG. 3 is a detailed logical block diagram showing basic logic blocks associated with the apparatus for channel estimation of the current invention. A single logical modem is shown with DSP 300 handling the digital modulation/demodulation. These blocks may be implemented within the existing processing units of one or more physical or logical modems. A digital signal processor 300 is shown coupled to the transmit signal path 302. During channel estimation a pseudo-random noise generator (PRN) 238 is coupled to the transmit signal path to periodically inject a codeword into the transmission path. The codeword is converted to analog format in digital-to-analog converter (DAC) 260. The corresponding amplified signal is generated by amplifier 262 on downstream signal line 304 which couples the transmit path to the hybrid 306. The hybrid is shown coupled to the transformer 308 which in turn is coupled to the subscriber line, e.g. 160 (See FIG. 1). The current invention may be applied with equal advantage in optical media as well. During channel estimation the transmission of each codeword effects a leakage signal corresponding with that codeword which is detected in the out-of-band upstream channel 312. This leakage signal and the various signals reflected from the discontinuities 162–164 are received on the upstream, received signal path, as a composite signal. Where the particular X-DSL or other communication protocol includes filters on either the transmit or receive path, e.g. filter 326 that filter may preferably be switchably decoupled from the corresponding path so as not to limit channel estimation. The composite signal is amplified in amplifier 272 and the output is digitized within ADC 276. The digitized output of the ADC is detected by correlator 284 which may be switchably coupled with the receive path 314. The correlator generates correlation coefficients, detects peaks therein including the leakage peak, and sequentially orders the peaks corresponding to each of the reflected signals from each of the discontinuities in the channel with respect thereto.

Figure 4A:
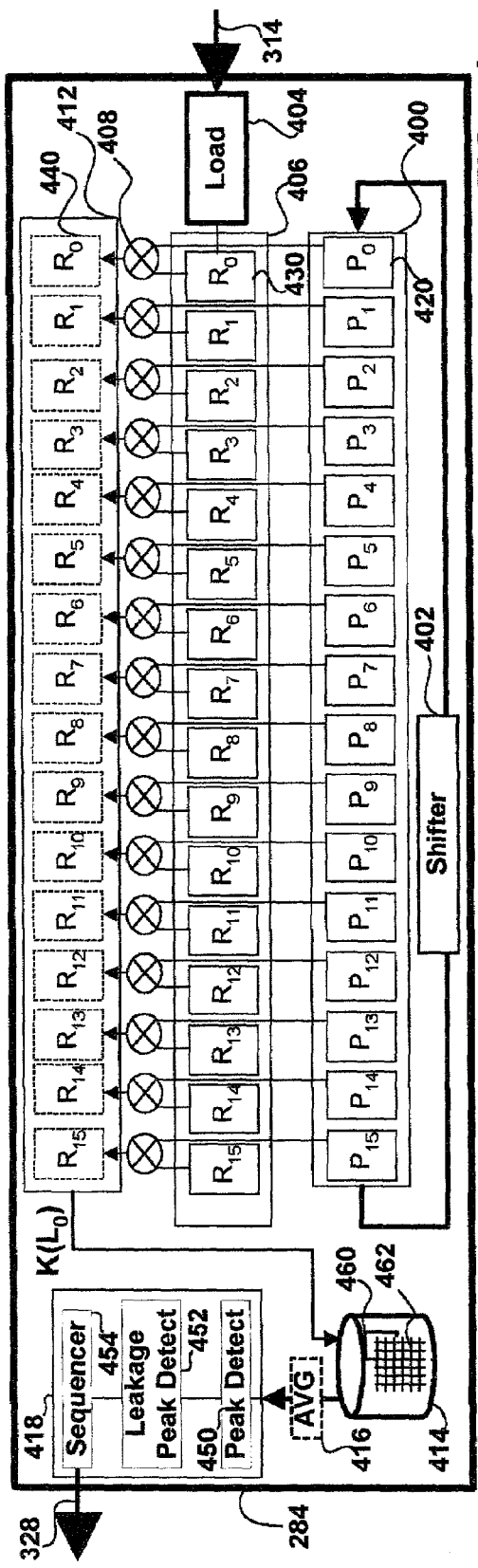
FIGS. 4AB show alternate embodiments of the correlator module shown in FIG. 3.

FIGS. 4AB show alternate embodiments of the correlator module shown in FIG. 3. In the first embodiment shown in FIG. 4A the correlator includes: a code word buffer, a received signal buffer 406, a multiplier bank, a summer 412 a memory 414 and a detector 418. The "N" bits of the complete codeword are stored within the individual locations, e.g. location 420 of codeword buffer 400. The codeword has a length which corresponds with the longest delay time for a reflected signal for the associated channel. In the example shown the codeword $P_0$–$P_{15}$ is sixteen bits in length. A circular shifter 402 allows the individual bits of the within the code word register to be circular shifted during correlation of the composite signal on the receive path 314. A loader 404 coupled to the input of the receive buffer 406 allows the composite received signal on line 314 the to be loaded into the receive buffer. The number of bits in the received buffer is shown corresponding with the number of bits in the codeword, though this need not be the case.

Once the code word and received signal are loaded into their respective buffers each bit of the codeword buffer is multiplied by a corresponding bit in the receive buffer by a corresponding multiplier within the multiplier bank and the results are placed in corresponding bit locations within summer 412. Thus the codeword bit stored in bit location 420 in the codeword buffer is multiplied by multiplier 408 times the codeword bit in location 430 in the receive buffer 406 and the output is placed in location 440 in summer 412. Then the contents of the summer are added and the corresponding correlation coefficient $K(L_n)$ is stored in the coefficient table 462 within memory 414. Then the codeword is shifted via shifter 402 and the process is repeated for the calculation of the next correlation coefficient. This is continued at least until the complete codeword has been rotated and the process may be repeated is averaging of coefficients across multiple sample sets is called for as a way of increasing the accuracy of the result.

The memory also includes program code for effecting the processes shown in the following FIG. 6. After the coefficient table 462 is completed with an ordered set of the calculated coefficients one or more additional runs of the aforementioned logic may be accomplished in which case the contents of the coefficient table are averaged in averager 416 to produce a single coefficient table. In either case, the ordered correlation coefficients of table 462 are provided to detector 418. Detector 418 includes the peak detector 450, a leakage peak detector 452, and the sequencer 454. The peak detector 450 determines the location and number of the peaks within the ordered coefficient list. This may be done using a number of techniques well known to those skilled in the art including a fixed threshold a crossing and recrossing of which signifies a peak or valley. Next the leakage peak detector 452 determines on the basis of the relative spacing between peaks which among the peaks is the leakage peak. The leakage peak in an embodiment of the invention is the first peak following the tail of the echoes. It is the peak the location of which is spaced furthest apart in the correlation coefficient table from a preceding peak. The sequencer then orders each of the reflective peaks which correspond to each of the reflective signals with respect to leakage peak in terms of both their offset in relative magnitude. This information is then provided on output 328. This information may then be processed further to determine the location of the discontinuity based on signal propagation times within the subscriber line and the offset of the corresponding reflection peak from the leakage peak. Additionally the magnitude and other parameters of each reflective peak may be compared with known values for various types of line discontinuities such as taps, and bridges to identify the discontinuity not only by location but by type. Channel or line estimation may also be used to disqualify, or qualify a particular line for one or more of the X-DSL protocols. A line with many discontinuities might not qualify for VDSL service but may qualify for G.Lite or other low bandwidth ones of the X-DSL protocols.

Figure 4B:
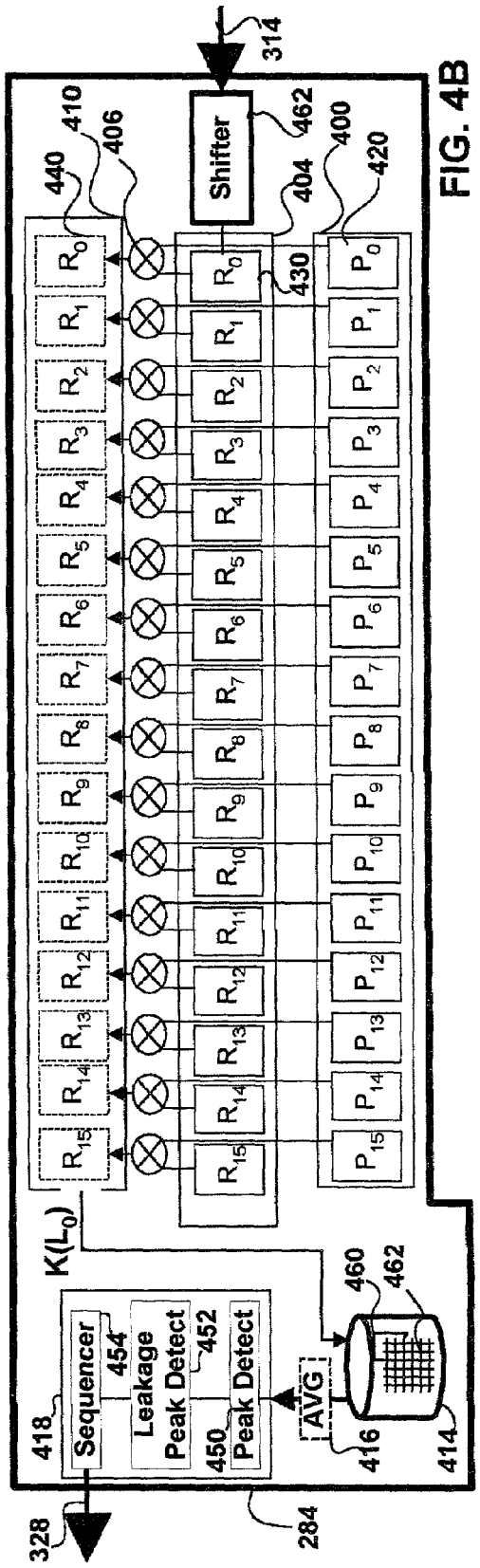

In FIG. 4B an alternate embodiment of the correlator 284 is shown. This embodiment is identical in all respects to the embodiment shown in FIG. 4A with the exception that the individual bits within the code word buffer 400 are fixed and the bits within the receive buffer 404 are shifted via shifter 462 as each new bit of the composite signal is received on signal line 314.

In alternate embodiments of the invention the multipliers of the multiplier bank may be replaced with simpler circuitry where the codeword is limited to a random sequence of "0"s together with "1"s. In a first of these embodiments where the incoming data is in sign plus magnitude format the multiplier can be replaced by a simple circuit using an "XOR" gate. Alternately, where the codeword bits are expressed in twos complement format the multiplier may be replaced by a multiplexer coupled to the corresponding bit of the codeword buffer and a pair of inputs, one of which is inverted, coupled to the corresponding bit of the receive buffer.

In alternate embodiments of the invention the logic shown in FIGS. 4A–B may be implemented in hardware, or software on a physical modem, in the DSP or AFE of a logical modem, by software executed on a processor or by dedicated or shared circuitry.

Figure 5A:
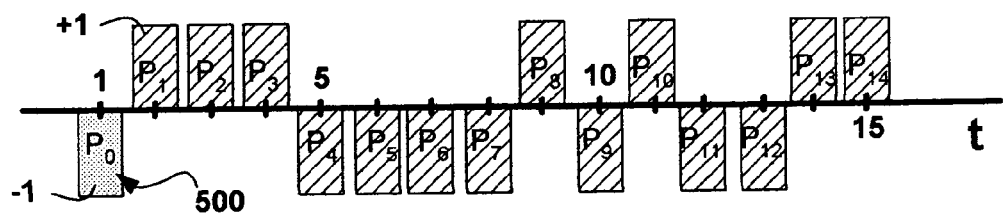
FIG. 5A is a graph showing an example of the codeword injected into the transmit path of the in accordance with an embodiment of the invention.

FIG. 5A is a graph showing an example of the codeword injected into the transmit path in accordance with an embodiment of the invention. The codeword is 16 bits in length and includes a pseudo random sequence of +/− "1"s commencing with bit $P_0$ referenced as 500 shown in a dotted pattern. This signal may be periodically injected by the PRN generator into a corresponding subscriber line transmit path for channel characterization.

Figure 5B:
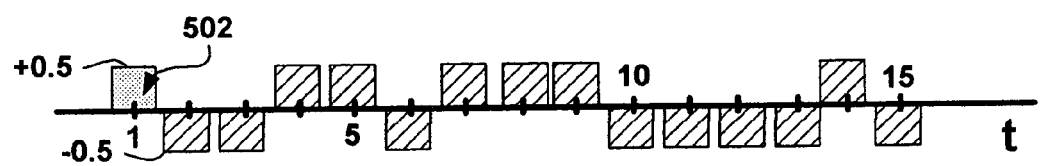
FIGS. 5B–D show the leakage signal, a reflected signal, and the composite of the leakage and reflected signals respectively which are effected on the receive path responsive to the injection of the codeword.
Figure 5C:
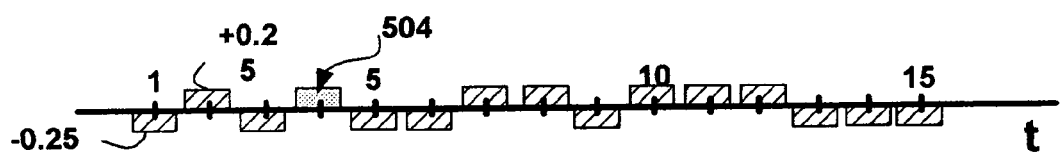
Figure 5D:
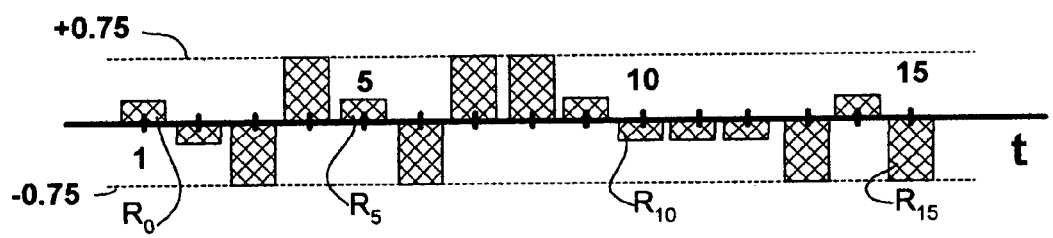

FIGS. 5B–D show the leakage signal commencing at 502, a reflected signal commencing at 504, and the composite signal resulting from the leakage and reflected signals respectively which are effected on the receive path responsive to the injection of the codeword shown in FIG. 5A into the transmit path.

Figure 5E:
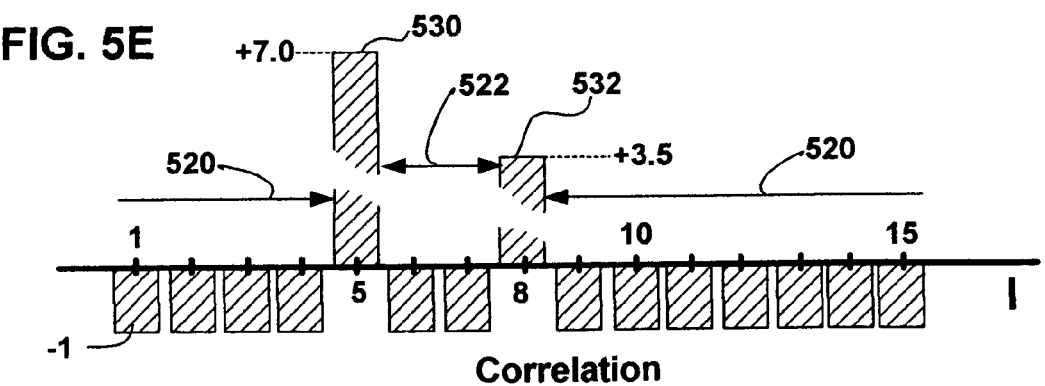
FIG. 5E shows the correlation factors for the received signal.

FIG. 5E shows the correlation factors for the received signal. Two peaks in the ordered set of coefficients are shown, peak 530 and peak 532. Depending on the initial sampling of the composite received signal these could occur in the order shown or could be shifted across/around the correlation graph. In the example shown the leakage peak 530 follows the interval of greatest separation between peaks, i.e. interval 520. This corresponds with the tail of the reflections from the furthest end of the subscriber line in which any reflections are most severely attenuated. The leakage peak is separated by interval 522 from the first correlation coefficient peak 532 which peak corresponds with the first reflected signal from the first discontinuity on the corresponding subscriber line, e.g. line 160, discontinuity 162 (See FIG. 1).

The following is a mathematical exposition of an embodiment of the processes associated with the correlator of the current invention. The channel estimation and/or line qualification utilizes, in this embodiment of the invention, a pseudo-random sequence to detect the discontinues and bridge taps in the line. The pseudo-random sequences can be generated in various ways, but they all possess the following property.

$$\sum_i P(n-q_j)P(n-l_i) = \begin{cases} 0 & q_i = l_i \\ 0 & q_j \neq l_j \end{cases} \quad \text{Equation 1}$$

where delay is defined as a circular shift. The above property states that the dot product of a sequence with its circularly shifted version is substantially zero and equal to a non-zero positive constant for zero shift case. One of the ways to produce a pseudo-random sequence is by means of feedback shift-register (m-sequence) in which case equation (1) is expressed as:

$$\sum_{n=0}^{N-1} P(n-q_j)P(n-l_j) = \begin{cases} N & q_j = l_i \\ -1 & q_j \neq l_j \end{cases} \quad \text{Equation 2}$$

where N is the period of the pseudo-random sequence.

The system starts by transmitting a pre-defined pseudo-random sequence generated in time. The duration of the transmitted pre-defined pseudo-random sequence should be longer than multiple periods of the sequence. The received signal is the superposition of the leakage of the transmitted signal via the hybrid 308 (See FIG. 3) and the reflections of the signal due to discontinuities in the line. The received signal is mathematically modeled as $$r(n) = \sum_{i=0}^{M} \alpha_i p(n - \tau_i) \quad \text{Equation 3}$$

where $\alpha_0 p(n-\tau_0)$ is the leaked transmit signal via the hybrid circuitry, and the terms corresponding to i=1 . . . M is caused by the reflection of the discontinues of the line. At the receiver, the received signal r(n) is cross-correlated against the same pseudo-random sequence generated locally. Assuming a feedback shift-register m-sequence was utilized as the pseudo-random sequence, the cross-correlation function is presented below.

$$K(l) = \sum_{n=0}^{N-1} r(n)p(n-l) = \left( \sum_{i=0}^{M} (N+1)\alpha_i \delta(l-\tau_i) \right) - 1 \quad \text{Equation 4}$$

for $l = 0, \ldots, N-1$ where $$\delta(l-k) = \begin{cases} 1 & k = l \\ 0 & k \neq l \end{cases} \quad \text{Equation 5}$$

In the above calculation of K(l), it is assumed that p(n) is periodic with period N. The receiver by observing K(l) will utilize the calculated the values of $\alpha_i$ for i=1 . . . M and $d_i = \tau_i - \tau_0$ for i=1, . . . M to estimate the line insertion loss. Moreover, the cross-correlation function K(l) can also be calculated as follow $$K(l) = \sum_{n=0}^{N-1} r(n-l)p(n) = \left( \sum_{i=0}^{M} (N+1)\alpha_i \delta(l-\tau_i) \right) - 1 \quad \text{Equation 6}$$

for $l = 0, \ldots, N-1$

Assuming the presence of noise in the receive signal, estimating K(l) using Eq. 6 has the advantage of being able to average the received signal overtime to reduce the noise effect. The averaging operation is shown below $$\overline{K}(l) = \frac{1}{P} \sum_{i=0}^{P} K(l + Ni) \text{ for } l = 0, \ldots, N-1 \quad \text{Equation 7}$$

The line insertion loss will be an indication of the possible data throughput of the line, which will determine if the line is qualified to carry a given DSL service. FIG. 5A shows one period of m-sequence, of period $2^4 - 1 = 15$. The transmitted sequence is a repeated version of the m-sequence shown in FIG. 5A. The received sequence shown in FIG. 5D, is a super-position of the transmit leakage via hybrid shown in FIG. 5B as well as the reflection shown in FIG. 5C. The shift 522 between the two is $\tau_l - \tau_0 = 3$. The relative magnitudes are $\alpha_l = 0.5$, $\alpha_r = 0.25$ respectively. The cross correlation shown in FIG. 5E is done in a circular fashion.

Figure 6:
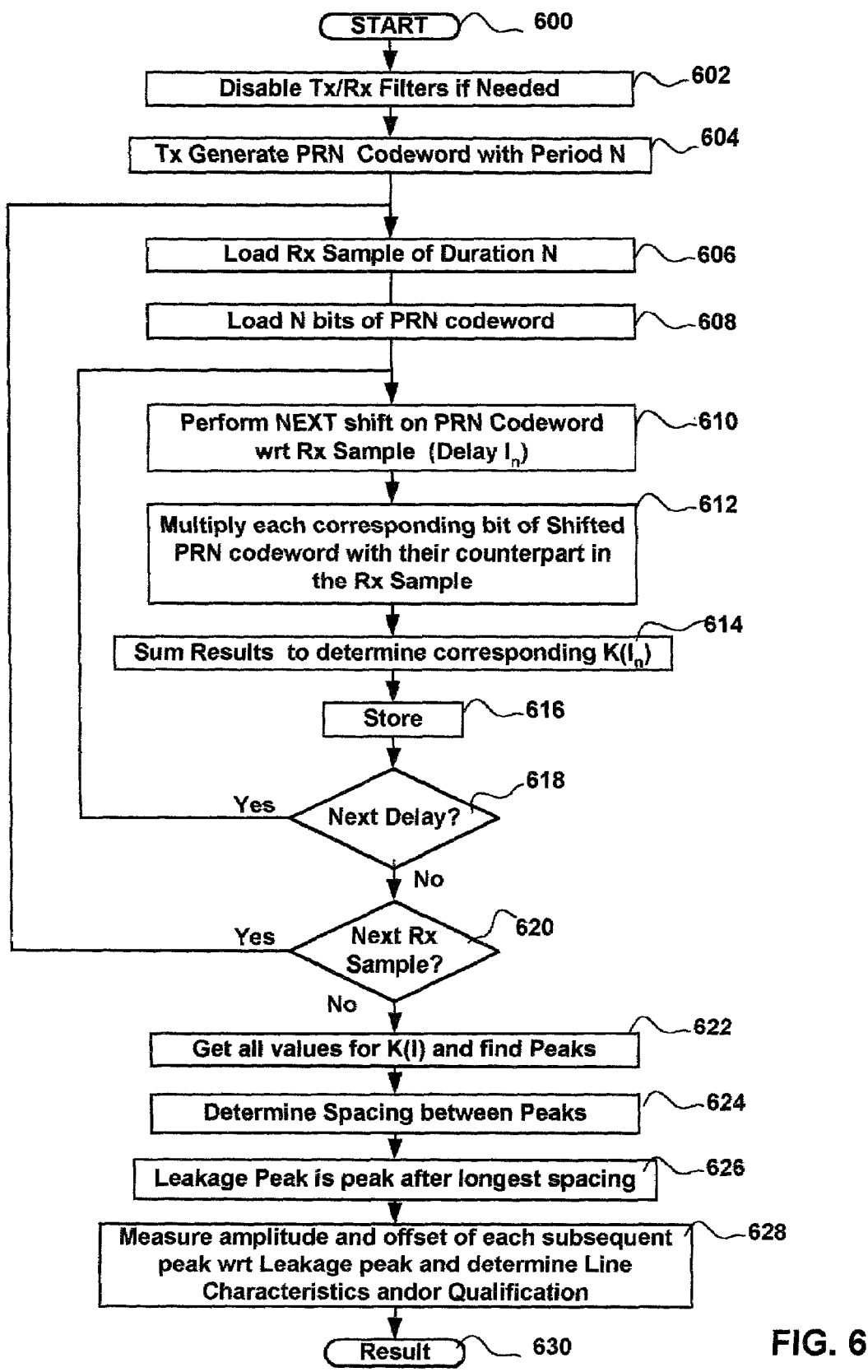
FIG. 6 is a process flow diagram of the channel estimation processes.

FIG. 6 is a process flow diagram of the channel estimation processes corresponding with the embodiment of the correlator shown in FIG. 4A. Processing begin at start block 600 from which control is passed to process 602. In process 602 any interfering transmit filters in the transmit or receive path are de-coupled from the corresponding path. Control is then passed to process 604. In process 604 the PRN generator 238 (See FIG. 380) injects a code word with period "N" into the transmit path. Control then passes to process 606. In process 606 a receive signal of duration "N" bits is loaded into the receive buffer 406 (See FIG. 4A). Control then passes to process 608 in which the N bits of the PRN codeword are loaded into the corresponding locations within codeword buffer 400 (See FIG. 4A). Control then passes to process 610. In process 610 to the first/next shift of the PRN codeword in buffer 400 is accomplished by shifter 402 (See FIG. 4A). Control than passes to process 612. In process 612 each corresponding bit within the codeword buffer is multiplied by the corresponding bit in the receive sample buffer 406 and passed to the corresponding locations in summer 412 (See FIG. 4A). Control then passes to process 614. In process 614 the multiplication results are summed to produce the corresponding correlation coefficient $K(L_n)$. Next in process 616 this coefficient is stored in the coefficient table 462 (See FIG. 4A). Control than passes decision block 618. In decision block 618 a determination is made as to whether there are any remaining shifts of the codeword buffer. If there are then control returns to process 610. If not control passes to decision process 620. In decision block 620 a determination is made as to whether another receive sequence will be processed, in order to further improve the accuracy of the set of correlation coefficients through averaging thereof across multiple correlation sets. If so, control returns to process 606. Alternately control passes to process 622.

In process 622 the ordered set of correlation coefficients is retrieved from memory 414 and the peaks within the correlation coefficients are determined. Control than passes to process 624 for a determination of the spacing between peaks including the spacing between the last peak and the first peak. Next in process 626 the leakage peak is determined on the basis of the differences determined in process 624. The leakage peak as discussed above follows the greatest inter peak separation/spacing. The leakage peak follows the tail of the reflected signals which corresponds with this spacing. Depending on the phasing of the sampling of the composite signal on the receive signal path the leakage peak may correspond with the first, the last, or an intermediate one of the peaks within the ordered set of correlation coefficients. Control than passes to process 628 in which the amplitude and offset of each subsequent peak with respect to the leakage peak determined. These results may be subject to further processing for the determination of line characteristics i.e. discontinuity location and discontinuity type.

The processes shown in FIG. 6 may be altered to correspond with the embodiment of the correlator shown in FIG. 4B by shifting the receive buffer rather than the codeword buffer.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for channel estimation in a communication device having a transmit path and a receive path both coupled to a communication medium, and the apparatus comprising:
  a pseudo-random noise generator (PRN) coupled to the transmit path to inject a codeword consisting of '+1's together with '−1's or '0's together with '1's into the transmit path;
  a correlator coupled to the receive path to generate an ordered set of correlation coefficients corresponding with successive phasings of the codeword with respect to a received signal, and the correlator including:
    a detector to detect peaks within the ordered set of correlation coefficients including both a peak corresponding with a leakage signal together with at least one other peak corresponding to a reflection of the injected codeword by the communication medium, and the detector determining at least one of the offset between peaks or a relative magnitude of the peaks, thereby estimating the channel characteristics across the communication medium;
    a plurality of XOR gates each with an output and a pair of inputs a first of which pair of inputs couples to a corresponding bit of the codeword and a second of which pair of inputs couples to a corresponding sample of the received signal;
    a shifter to shift the codeword with respect to the corresponding samples of the received signal or vice-versa; and
    a summer coupled to the outputs of each bit of the plurality of XOR gates to sum the outputs of the plurality of the plurality of XOR gates codeword on each shift of the shifter, thereby generating successive ones of the ordered set of correlation coefficients.

2. An apparatus for determining the location and magnitude of discontinuities or faults within the communication medium to which the X-DSL communication device is coupled. The information provided by the divice may be used for line qualification or repair. No additional equipment is required for channel estimation. Instead the apparatus may be located within a single modem or shared between a group of modems. An N bit pseudo random codeword injected into the transmit path is used to generate both a leakage signal and a plurality of reflected signals on the receive path. No timing information is needed from the transmit path. Instead a unique correlator is utilized on the receive path to extract timing information for the reflected signals relative to the leakage signal. The broad bandwidth of the codeword and its relatively long duration allow channel estimation at significantl higher signal-to-noise ratios and with greater degrees of accuracy than heretofore possible.

3. A method for channel estimation in a communication device having a transmit path and a receive path both coupled to a communication medium, and the method comprising the acts of:
  injecting a pseudo-random codeword into the transmit path of the communication device;
  generating from the receive path an ordered set of correlation coefficients corresponding with successive phasings of the pseudo-random codeword with respect to a received signal resulting from the injecting act;

detecting peaks within the ordered set of correlation coefficients including both a peak corresponding with a leakage signal together with at least one other peak corresponding to a reflection of the injected pseudo-random codeword by the communication medium;

determining which among the peaks detected detected in the detecting act corresponds with the leakage peak; and sequentially ordering the peaks corresponding with a time of receipt of each of the reflected signals with respect to the leakage signal to estimate channel characteristics for the communication medium; and determining at least one of the offset between peaks or a relative magnitude of the peaks, thereby estimating the channel characteristics across the communication medium.

* * * * *

UNITED STATES PATENT AND TRADEMARK OFFICE
CERTIFICATE OF CORRECTION

| | |
|---|---|
| PATENT NO. | : 6,985,521 B1 |
| APPLICATION NO. | : 09/779789 |
| DATED | : January 10, 2006 |
| INVENTOR(S) | : Behrooz Rezvani, Sam Heidari and Dale Smith |

It is certified that error appears in the above-identified patent and that said Letters Patent is hereby corrected as shown below:

Col. 14, lines 41-58 should be deleted and the following inserted:

--2. An apparatus for channel estimation in a communication device having a transmit path and a receive path both coupled to a communication medium, and the apparatus comprising;
a pseudo-random noise generator (PRN) coupled to the transmit path to inject a code word into the transmit path;
    a correlator coupled to the receive path to generate an ordered set of correlation coefficients corresponding with successive phasings of the codeword with respect to a received signal, and the correlator including:
    a detector to detect peaks within the ordered set of correlation coefficients including both a peak corresponding with a leakage signal together with at least one other peak corresponding to a reflection of the injected codeword by the communication medium, and the detector determining at least one of the offset between peaks or a relative magnitude of the peaks, thereby estimating the channel characteristics
across the communication medium. and the detector including:
        a peak detector for detecting peaks within the ordered set of correlation
 coefficients;
        a leakage peak detector for determining which among the peaks detected by said peak detector corresponds with the leakage peak; and
        a sequencer for sequentially ordering the peaks corresponding with a time of receipt of each of the reflected signals with respect to the peak corresponding with the time of receipt of the leakage signal to estimate channel characteristics for the communication medium. --

Signed and Sealed this

Twenty-eighth Day of November, 2006

JON W. DUDAS
*Director of the United States Patent and Trademark Office*